United States Patent
Hong

(10) Patent No.: US 11,265,750 B2
(45) Date of Patent: Mar. 1, 2022

(54) NETWORK MANAGEMENT METHOD, DEVICE, SYSTEM AND COMPUTER READABLE STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/964,573

(22) PCT Filed: Jan. 30, 2018

(86) PCT No.: PCT/CN2018/074531
§ 371 (c)(1),
(2) Date: Jul. 23, 2020

(87) PCT Pub. No.: WO2019/148313
PCT Pub. Date: Aug. 8, 2019

(65) Prior Publication Data
US 2021/0044997 A1 Feb. 11, 2021

(51) Int. Cl.
*H04W 4/00* (2018.01)
*H04W 24/10* (2009.01)
(Continued)

(52) U.S. Cl.
CPC .......... *H04W 24/10* (2013.01); *H04B 17/318* (2015.01); *H04W 36/08* (2013.01); *H04W 36/32* (2013.01); *H04W 76/11* (2018.02)

(58) Field of Classification Search
CPC ..... H04W 24/10; H04W 76/11; H04W 36/08; H04W 36/32; H04W 36/30; H04W 24/08;
(Continued)

(56) References Cited

U.S. PATENT DOCUMENTS 9,923,608 B2 * 3/2018 Axmon ............... H04B 7/086
10,009,908 B2 * 6/2018 Palenius ............... H04W 76/27
(Continued)

FOREIGN PATENT DOCUMENTS

| CN | 101577950 A | 11/2009 |
|---|---|---|
| CN | 102014446 A | 4/2011 |

(Continued)

OTHER PUBLICATIONS

International Search Report to PCT Application No. PCT/CN2018/074531 dated Sep. 26, 2018 with English translation, (4p).

(Continued)

*Primary Examiner* — Amancio Gonzalez
(74) *Attorney, Agent, or Firm* — Arch & Lake LLP

(57) ABSTRACT

The present disclosure provides a method for network management, device and system and a computer-readable storage medium, and belong to the technical field of communication. The method includes that: first measurement configuration information is sent to a target terminal device in a high-speed-railway dedicated network; first measurement report information from the target terminal device is received, the first measurement report information being obtained after the target terminal device performs cell measurement based on the first measurement configuration information and the first measurement report information including cell type information of a cell measured by the target terminal device; and a network management is executed on the target terminal device based on the cell type information. According to the present disclosure, functions of the high-speed-railway dedicated network are enriched, and the flexibility in the use of the high-speed-railway dedicated network is improved.

16 Claims, 9 Drawing Sheets

(51) Int. Cl.
*H04B 17/318* (2015.01)
*H04W 76/11* (2018.01)
*H04W 36/08* (2009.01)
*H04W 36/32* (2009.01)

(58) Field of Classification Search
CPC . H04W 36/00; H04W 36/0083; H04B 17/318
USPC .......................................................... 370/329
See application file for complete search history.

(56) References Cited

U.S. PATENT DOCUMENTS

| | | | |
|---|---|---|---|
| 2010/0130211 | A1 | 5/2010 | Bae et al. |
| 2020/0236605 | A1* | 7/2020 | Yiu ........................ H04W 48/20 |

FOREIGN PATENT DOCUMENTS

| | | |
|---|---|---|
| CN | 102647766 A | 8/2012 |
| CN | 103906127 A | 7/2014 |
| CN | 104620625 A | 5/2015 |
| CN | 106572508 A | 4/2017 |
| JP | 2015177523 A | 10/2015 |
| WO | 2015154477 A1 | 10/2015 |

OTHER PUBLICATIONS

Supplementary European Search Report in the European Application No. 18903351.7, dated Aug. 9, 2021, (14p).

Intel Corporation et al.: "Cell reselection for the UE on high-speed-dedicated network", 3GPP Draft; R2-1712616, 3rd Generation Partnership Project (3GPP), Mobile Competence Centre; 650, Route Deslucioles: F-06921 Sophia-Antipolis Cedex; France, vol. RAN WG2, No. Reno, United State; Nov. 30, 2017-Dec. 3, 2017, Nov. 17, 2017 (Nov. 17, 2017), XP051371548, (4p).

Intel Corporation: "Enabling of High Speed Train Indication", 3GPP Draft: R2-166273 HST, 3rd Generation Partnership Project (3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016, Oct. 9, 2016 (Oct. 9, 2016), XP051150863, (13 p).

* cited by examiner

NETWORK MANAGEMENT METHOD, DEVICE, SYSTEM AND COMPUTER READABLE STORAGE MEDIUM

CROSS REFERENCE TO RELATED APPLICATIONS

The present application is the U.S. national phase of PCT Application No. PCT/CN2018/074531 filed on Jan. 30, 2018, which is incorporated herein by reference in its entirety for all purposes.

TECHNICAL FIELD

The present disclosure generally relates to the technical field of communication, and particularly, to a method, device and system for network management and a computer-readable storage medium.

BACKGROUND

Along with the rapid development of technologies for high-speed railways, more and more users select high-speed railways to travel. For meeting a communication requirement of users taking a high-speed train and ensuring the communication quality for the users on the high-speed train, service providers select to deploy a high-speed-railway dedicated network on a high-speed railway to try to specially provide service for users on the high-speed train through the high-speed-railway dedicated network.

In a high-speed-railway dedicated network, multiple cascaded Radio Remote Units (RRUs) may act as a cell to provide service for users on a high-speed train, so that the high-speed-railway dedicated network can have a higher signal coverage capability, and the communication quality can be further ensured for the users on the high-speed train.

However, the high-speed-railway dedicated network has a relatively undiversified function and is relatively low in flexibility in use.

SUMMARY

The present disclosure provides a method, device and system for network management and a computer-readable storage medium, which may enrich functions of a high-speed-railway dedicated network and improve the flexibility in the use of the high-speed-railway dedicated network.

According to a first aspect of embodiments of the present disclosure, a method for network management is provided, which may include that:

first measurement configuration information is sent to a target terminal device in a high-speed-railway dedicated network;

first measurement report information sent by the target terminal device is received, the first measurement report information being obtained after the target terminal device performs cell measurement based on the first measurement configuration information, and the first measurement report information including cell type information of a cell measured by the target terminal device; and network management on the target terminal device is executed based on the cell type information.

Optionally, the method may further include that:

before the first measurement configuration information is sent to the target terminal device in the high-speed-railway dedicated network, second measurement configuration information is sent to the target terminal device; and second measurement report information sent by the target terminal device is received, the second measurement report information being obtained after the target terminal device performs cell measurement based on the second measurement configuration information, the second measurement report information including a physical-layer cell identity (PCI) of at least one cell, and the at least one cell being a cell which is selected from cells measured by the target terminal device based on the second measurement information and of which a signal strength meets a preset condition.

Optionally, the operation that the first measurement configuration information is sent to the target terminal device in the high-speed-railway dedicated network may include that:

the first measurement configuration information is generated according to the PCI of the at least one cell, the first measurement configuration information including the PCI of the at least one cell; and the first measurement configuration information is sent to the target terminal device, the first measurement configuration information being configured for the target terminal device to generate the first measurement report information including cell type information of a target cell, and the target cell being an intersection of the cells measured by the target terminal device based on the second measurement configuration information and the at least one cell.

Optionally, the cell of which the signal strength meets the preset condition may include:

a cell with a maximum signal strength among the cells measured based on the second measurement configuration information, or, a cell with a signal strength greater than a preset strength threshold among the cells measured based on the second measurement configuration information.

Optionally, the operation that the first measurement configuration information is sent to the target terminal device in the high-speed-railway dedicated network may include that:

the target terminal device is determined among all terminal devices connected with a base station; and the first measurement configuration information is sent to the target terminal device.

Optionally, the operation that the target terminal device is determined among all the terminal devices connected with the base station may include that:

a signal strength of a signal sent by each terminal device among all the terminal devices is acquired; and the target terminal device is determined among all the terminal devices based on the signal strength.

Optionally, the operation that the target terminal device is determined among all the terminal devices connected with the base station may include that:

a movement speed of each terminal device is acquired among all the terminal devices; and the target terminal device is determined among all the terminal devices based on the movement speeds of all the terminal devices.

According to a second aspect of the embodiments of the present disclosure, a method for network management is provided, which may include that:

first measurement configuration information sent by a base station in a high-speed-railway dedicated network is received;

cell measurement is performed based on the first measurement configuration information to acquire cell type information of a cell measured by a target terminal device; and first measurement report information is sent to the base station, the first measurement report information including the cell type information of the cell measured by the target terminal device, and the cell type information being configured for the base station to execute network management on the target terminal device.

Optionally, the method may further include that:

second measurement configuration sent by the base station is received;

cell measurement is performed based on the second measurement configuration information to acquire signal strengths of cells measured by the target terminal device based on the second measurement configuration information; and second measurement report information is sent to the base station, the second measurement report information including a PCI of at least one cell, and the at least one cell being a cell which is selected from the cells measured by the target terminal device based on the second measurement information and of which a signal strength meets a preset condition.

Optionally, the operation that cell measurement is performed based on the first measurement configuration information may include that:

cell measurement is performed on a target cell based on the first measurement configuration information, the target cell being an intersection of the cells measured by the target terminal device based on the second measurement configuration information and the at least one cell.

Optionally, the cell of which the signal strength meets the preset condition may include:

a cell with a maximum signal strength among the cells measured based on the second measurement configuration information, or, a cell with a signal strength greater than a preset strength threshold among the cells measured based on the second measurement configuration information.

According to a third aspect of the embodiments of the present disclosure, a device for network management is provided, which may include:

a first sending module, configured to send first measurement configuration information to a target terminal device in a high-speed-railway dedicated network;

a first receiving module, configured to receive first measurement report information from the target terminal device, the first measurement report information being obtained after the target terminal device performs cell measurement based on the first measurement configuration information, and the first measurement report information including cell type information of a cell measured by the target terminal device; and a processing module, configured to execute network management on the target terminal device based on the cell type information.

Optionally, the device may further include:

a second sending module, configured to, before the first measurement configuration information is sent to the target terminal device in the high-speed-railway dedicated network, send second measurement configuration information to the target terminal device; and a second receiving module, configured to receive second measurement report information from the target terminal device, the second measurement report information being obtained after the target terminal device performs cell measurement based on the second measurement configuration information, the second measurement report information including a PCI of at least one cell, and the at least one cell being a cell which is selected from cells measured by the target terminal device based on the second measurement information and of which a signal strength meets a preset condition.

Optionally, the first sending module may be configured to:

generate the first measurement configuration information according to the PCI of the at least one cell, the first measurement configuration information including the PCI of the at least one cell; and send the first measurement configuration information to the target terminal device, the first measurement configuration information being configured for the target terminal device to generate the first measurement report information including cell type information of a target cell, and the target cell being an intersection of the cells measured by the target terminal device based on the second measurement configuration information and the at least one cell.

Optionally, the cell of which the signal strength meets the preset condition may include:

a cell with a maximum signal strength among the cells measured based on the second measurement configuration information, or, a cell with a signal strength greater than a preset strength threshold among the cells measured based on the second measurement configuration information.

Optionally, the first sending module may include:

a determination submodule, configured to determine the target terminal device among all terminal devices connected with a base station; and a sending submodule, configured to send the first measurement configuration information to the target terminal device.

Optionally, the determination submodule may be configured to:

acquire a signal strength of a signal sent by each terminal device among all the terminal devices; and determine the target terminal device among all the terminal devices based on the signal strength.

Optionally, the determination submodule may be configured to:

acquire a movement speed of each terminal device among all the terminal devices; and determine the target terminal device among all the terminal devices based on the movement speeds of all the terminal devices According to a fourth aspect of the embodiments of the present disclosure, a device for network management is provided, which may include:

a first receiving module, configured to receive first measurement configuration information from a base station in a high-speed-railway dedicated network;

a first measurement module, configured to perform cell measurement based on the first measurement configuration information to acquire cell type information of a cell measured by a target terminal device; and a first reporting module, configured to send first measurement report information to the base station, the first measurement report information including the cell type information of the cell measured by the target terminal device and the cell type information being configured for the base station to execute network management on the target terminal device.

Optionally, the device may further include:

a second receiving module, configured to receive second measurement configuration information from the base station;

a second measurement module, configured to perform cell measurement based on the second measurement configuration information to acquire signal strengths of cells measured by the target terminal device based on the second measurement configuration information; and a second reporting module, configured to send second measurement report information to the base station, the second measurement report information including a PCI of at least one cell and the at least one cell being a cell which is selected from the cells measured by the target terminal device based on the second measurement information and of which a signal strength meets a preset condition.

Optionally, the first measurement module may be configured to:

perform cell measurement on a target cell based on the first measurement configuration information, the target cell being an intersection of the cells measured by the target terminal device based on the second measurement configuration information and the at least one cell.

Optionally, the cell of which the signal strength meets the preset condition may include:

a cell with a maximum signal strength among the cells measured based on the second measurement configuration information, or, a cell with a signal strength greater than a preset strength threshold among the cells measured based on the second measurement configuration information.

According to a fifth aspect of the embodiments of the present disclosure, a device for network management is provided, which may include:

a processor; and a memory configured to store instructions executable by the processor, wherein the processor may be configured to:

send first measurement configuration information to a target terminal device in a high-speed-railway dedicated network;

receive first measurement report information from the target terminal device, the first measurement report information being obtained after the target terminal device performs cell measurement based on the first measurement configuration information and the first measurement report information including cell type information of a cell measured by the target terminal device; and execute network management on the target terminal device based on the cell type information.

According to a sixth aspect of the embodiments of the present disclosure, a device for network management is provided, which may include:

a processor; and a memory configured to store instructions executable by the processor, wherein the processor may be configured to:

receive first measurement configuration information from a base station in a high-speed-railway dedicated network;

perform cell measurement based on the first measurement configuration information to acquire cell type information of a cell measured by a target terminal device; and send first measurement report information to the base station, the first measurement report information including the cell type information of the cell measured by the target terminal device, and the cell type information being configured for the base station to execute network management on the target terminal device.

According to a seventh aspect of the embodiments of the present disclosure, a system for network management is provided, which may include a base station and a terminal device, wherein the base station may be configured to implement any method for network management of the first aspect; and the terminal device may be configured to implement any method for network management of the second aspect.

According to an eighth aspect of the embodiments of the present disclosure, a computer-readable storage medium is provided, in which a computer program may be stored, wherein the stored computer program may be executed by a processing component to implement any method for network management of the first aspect, or, the stored computer program may be executed by the processing component to implement any method for network management of the second aspect.

The technical solutions provided by embodiments of the present disclosure may have the following advantages.

According to the method, device and system for network management and computer-readable storage medium provided in the embodiments of the present disclosure, a base station in a high-speed-railway dedicated network may send first measurement configuration information to a target terminal device, the target terminal device may receive the first measurement configuration information, perform cell measurement based on it and send the cell type information of the cell measured by the target terminal device to the base station, and then the base station in the high-speed-railway dedicated network may execute network management on the target terminal device based on the cell type information. Compared with a related art, the present disclosure has the advantages that functions of the high-speed-railway dedicated network are enriched, and the flexibility in the use of the high-speed-railway dedicated network is further improved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

For making the purposes, technical solutions and advantages of the present disclosure clearer, implementation modes of the present disclosure will further be described below in combination with the accompanying drawings in detail.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
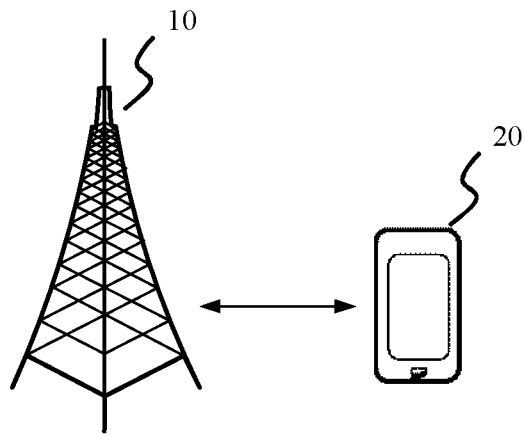
FIG. 1 is a schematic diagram illustrating an implementation environment involved in a method for network management according to an exemplary embodiment.

Referring to FIG. 1, which is a schematic diagram illustrating an implementation environment involved in a method for network management according to an embodiment of the present disclosure. As shown in FIG. 1, the implementation environment may include a base station 10 and a terminal device 20. The base station 10 may be connected with the terminal device 20 through a communication network, and the terminal device 20 can be any terminal device in a cell served by the base station 10. In an example, the communication network may be a high-speed-railway dedicated network, the base station 10 may be a base station in the high-speed-railway dedicated network, and the base station 10 may be arranged along a high-speed railway such that the high-speed-railway dedicated network covers the high-speed railway to conveniently provide communication service for users on high-speed trains.

Figure 2:
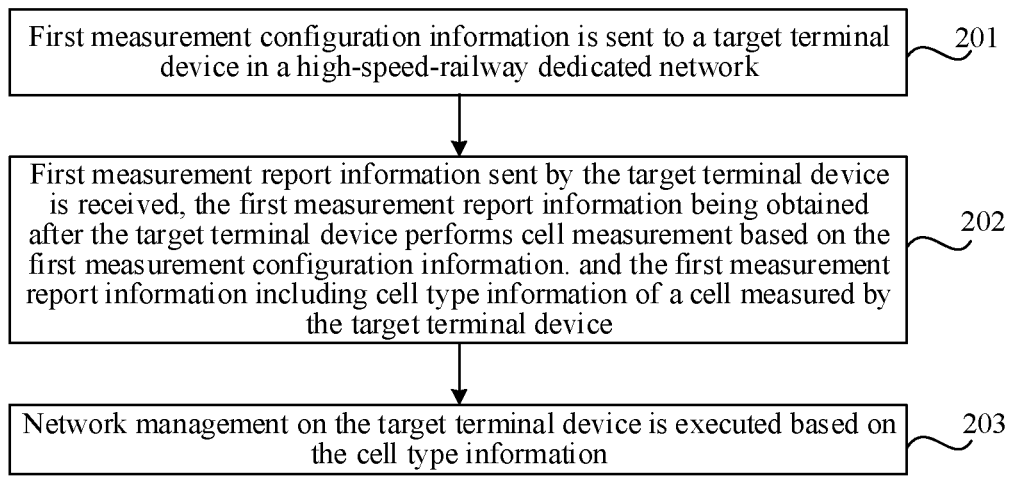
FIG. 2 is a flowchart showing a method for network management according to an exemplary embodiment.

FIG. 2 is a flowchart showing a method for network management according to an exemplary embodiment. The method for network management is applied to a base station in FIG. 1. As shown in FIG. 2, the method for network management may include the following operations.

In Operation 201, first measurement configuration information is sent to a target terminal device in a high-speed-railway dedicated network.

In Operation 202, first measurement report information sent by the target terminal device is received, the first measurement report information being obtained after the target terminal device performs cell measurement based on the first measurement configuration information, and the first measurement report information including cell type information of a cell measured by the target terminal device.

In Operation 203, network management on the target terminal device is executed based on the cell type information.

According to the method for network management provided in the embodiment of the present disclosure, the base station in the high-speed-railway dedicated network may send the first measurement configuration information to the target terminal device, receive the cell type information of the measured cell from the target terminal device and execute the network management on the target terminal device based on the cell type information. Compared with the related art, the present disclosure has the advantages that functions of the high-speed-railway dedicated network are enriched and the flexibility in the use of the high-speed-railway dedicated network is improved.

Figure 3:
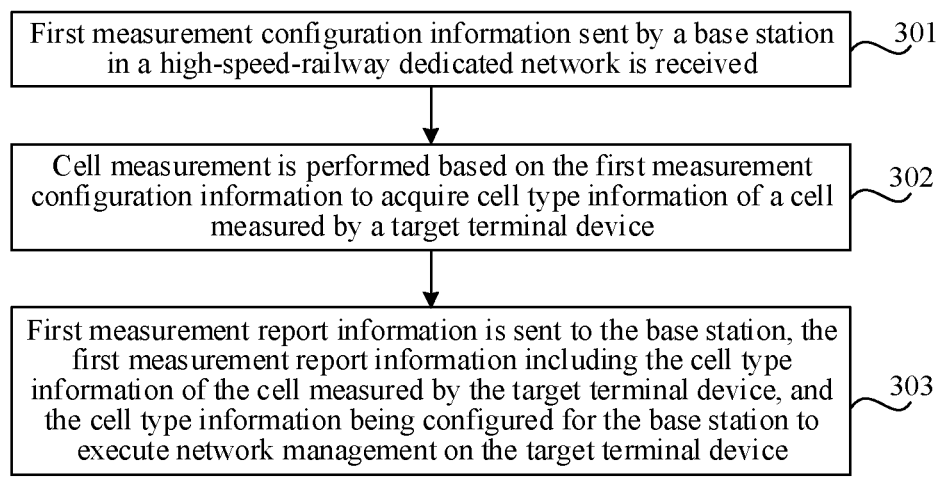
FIG. 3 is a flowchart showing another method for network management according to an exemplary embodiment.

FIG. 3 is a flowchart showing another method for network management according to an exemplary embodiment. The method for network management is applied to a terminal device in FIG. 1. As shown in FIG. 3, the method for network management may include the following operations.

In Operation 301, first measurement configuration information sent by a base station in a high-speed-railway dedicated network is received.

In Operation 302, cell measurement is performed based on the first measurement configuration information to acquire cell type information of a cell measured by a target terminal device.

In Operation 303, first measurement report information is sent to the base station, the first measurement report information including the cell type information of the cell measured by the target terminal device, and the cell type information being configured for the base station to execute network management on the target terminal device.

According to the method for network management provided in the embodiment of the present disclosure, the target terminal device may receive the first measurement configuration information from the base station in the high-speed-railway dedicated network, perform cell measurement based on the first measurement configuration information and send the cell type information of the cell measured by the target terminal device to the base station, and then the base station in the high-speed-railway dedicated network may execute the network management on the target terminal device based on the cell type information. Compared with the related art, the present disclosure has the advantages that functions of the high-speed-railway dedicated network are enriched and the flexibility in the use of the high-speed-railway dedicated network is further improved.

Figure 4:
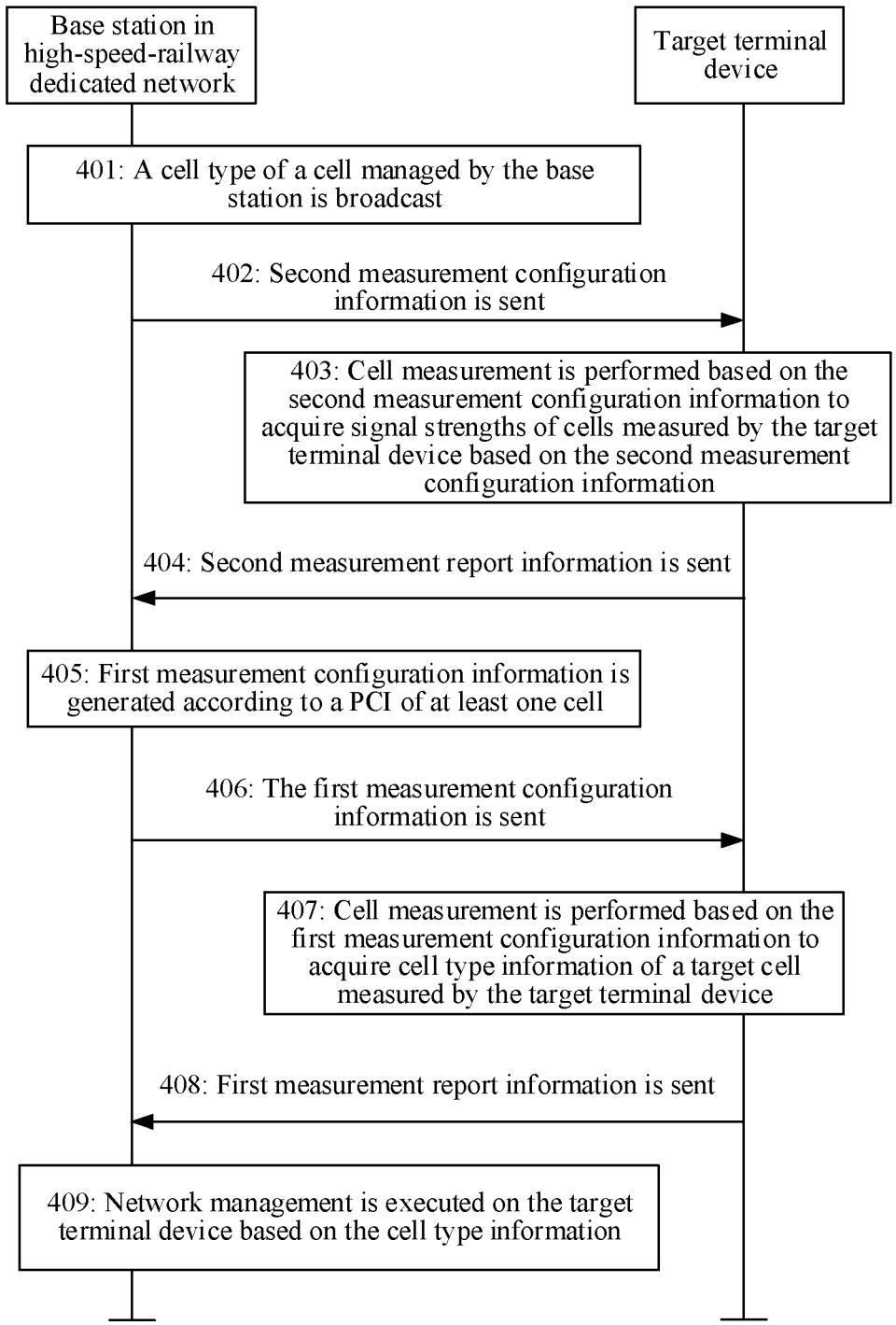
FIG. 4 is a flowchart showing another method for network management according to an exemplary embodiment.

FIG. 4 is a flowchart showing another method for network management according to an exemplary embodiment. The method for network management is applied to the implementation environment shown in FIG. 1. As shown in FIG. 4, the method for network management includes the following operations.

In Operation 401, a base station in a high-speed-railway dedicated network broadcasts a cell type of a cell managed by the base station.

The base station in the high-speed-railway dedicated network may broadcast information about the cell type of the cell managed by the base station through a system message such that the base station may execute network management on a terminal device connected with the base station based on the information about the cell type. The cell type of the cell managed by the base station can be a cell in the high-speed-railway dedicated network.

Figure 5:
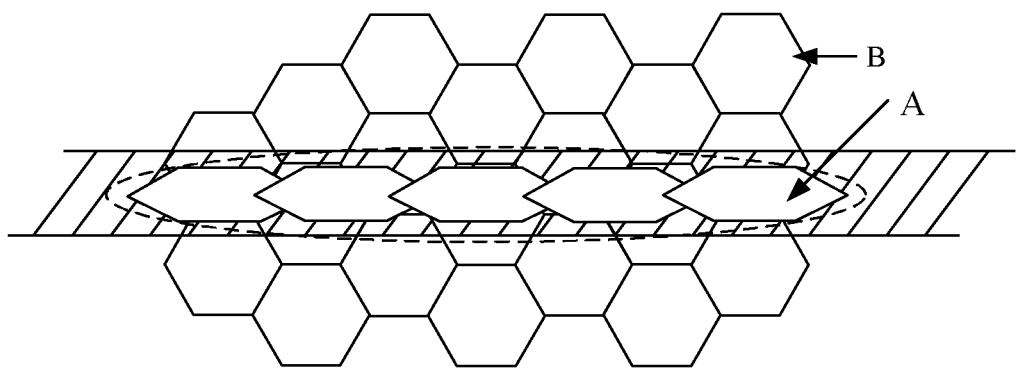
FIG. 5 is a schematic diagram illustrating deployment of cells in a high-speed-railway dedicated network and cells in a non-high-speed-railway dedicated network according to an exemplary embodiment.

It is to be noted that, for enabling a terminal device to acquire cell type information of a cell measured by the terminal device and managed by another base station, the another base station is also required to broadcast the cell type information of the cell managed by the another base station through a system message. The cell type of the cell managed by the another base station can be a cell in a non-high-speed-railway dedicated network. As shown in FIG. 5, network coverage of the non-high-speed-railway dedicated network is cellular (i.e., a range covered by cells B in FIG. 5). In an example, the cell in the non-high-speed-railway dedicated network may be a cell in a public long term evolution (LTE) network.

In Operation 402, the base station sends second measurement configuration information to a target terminal device.

Optionally, the base station may send measurement configuration signaling (i.e., measConfig signaling) containing the second measurement configuration information to the target terminal device to implement measurement configuration for the target terminal device, and the measurement configuration is made for enabling the target terminal device to report a signal strength of a measured cell.

The base station may send the second measurement configuration information to all terminal devices connected with the base station, the all terminal devices including the target terminal device. Or, the base station may select at least one terminal device to be configured from all the terminal devices connected with the base station and send the second measurement configuration information to the at least one terminal device to be configured, the at least one terminal device to be configured including the target terminal device.

During a practical application, there may be multiple implementation modes for selecting the terminal device to be configured from all the terminal devices connected with the base station. Descriptions are made with the following three implementable modes as examples in the embodiment of the present disclosure.

A first implementable mode is that: the base station acquires a signal strength of a signal sent by each terminal device among all the terminal devices and determines a terminal device to be configured from all the terminal devices based on the signal strength.

Optionally, the base station, responsive to determining the terminal device to be configured from all the terminal devices based on the signal strength, may determine a terminal device of which a signal strength is higher than a preset signal strength in all the terminal devices as a terminal device to be configured. Moreover, a value of the preset signal strength may be set according to a practical requirement.

A second implementable mode is that: the base station acquires a movement speed of each terminal device among all the terminal devices and determines a terminal device to be configured from all the terminal devices based on the movement speeds of all the terminal devices.

When a terminal device is a terminal device carried by a passenger on a high-speed train, a movement speed of the terminal device is apparently higher than a movement speed of a terminal device not in the high-speed train. Therefore, the base station, when determining the terminal device to be configured among all the terminal devices based on the movement speeds of all the terminal devices, may determine a terminal device with a movement speed higher than a preset speed as a terminal device to be configured. Moreover, a value of the preset speed may be set according to the practical requirement.

In an example, if the preset speed is 150 kilometers per hour and the base station determines that there are 100 terminal devices connected therewith, among which 30 terminal devices have movement speeds higher than the preset speed, the 30 terminal devices may be determined as terminal devices to be configured.

A third implementable mode is that: the base station randomly selects a terminal device to be configured from all the terminal devices connected with the base station.

In Operation 403, the target terminal device performs cell measurement based on the second measurement configuration information to acquire signal strengths of cells measured by the target terminal device based on the second measurement configuration information.

The target terminal device, after receiving the second measurement configuration information from the base station, may perform cell measurement based on the second measurement configuration information to acquire the signal strengths of the cells measured by the target terminal device based on the second measurement configuration information and PCIs of the corresponding cells to report the PCI of a cell with a signal strength meeting a preset condition.

Optionally, an implementation mode of Operation 403 may be as follows: the target terminal device performs cell searching based on the second measurement configuration information and determines signal strengths of found cells, and meanwhile, the target terminal device may further decode synchronization signals sent by base stations to which the found cells belong to acquire PCIs of the corresponding cells. The signal strength may be represented by a parameter such as reference signal receiving power (RSRP) or reference signal receiving quality (RSRQ).

It is to be noted that, for saving system resources, the target terminal device may periodically perform cell measurement based on the second measurement configuration information. Moreover, the high-speed-railway dedicated network and the non-high-speed-railway dedicated network may use the same frequency or different frequencies, so that cell measurement may include co-frequency measurement and inter-frequency measurement. There are no specific limits made thereto in the embodiments of the present disclosure.

In Operation 404, the target terminal device sends second measurement report information to the base station. Correspondingly, the base station receives the second measurement report information from the target terminal device.

The target terminal device, after performing cell measurement based on the second measurement configuration information, may obtain the corresponding second measurement report information and send the second measurement report information to the base station. Optionally, the second measurement report information may include a PCI of at least one cell. The at least one cell may be one or more cells which is/are selected from the cells measured by the target terminal device based on the second measurement information and has/have a signal strength(s) meet(s) the preset condition.

The measured cell can be a cell which is found by the target terminal device and of which the signal strength and PCI are successfully acquired. The cell of which the signal strength meets the preset condition may include: a cell with a maximum signal strength among the cells measured based on the second measurement configuration information, or, a cell with a signal strength greater than a preset strength threshold among the cells measured based on the second measurement configuration information. The preset strength threshold may be set according to the practical requirement.

In an example, the target terminal device, after receiving the second measurement configuration information from the base station, finds 5 cells based on the second measurement configuration information, the 5 cells being cell 1, cell 2, cell 3, cell 4 and cell 5 respectively and acquired RSRQ of the 5 cells being −5, −8, −9, −10 and −13 respectively, and the cell of which the signal strength meets the preset condition is the cell with the maximum signal strength in the measured cells, it can be seen according to the RSRQ of the 5 cells that the cell 1 has the maximum signal strength, and the second measurement report information sent to the base station by the target terminal device may include a PCI of the cell 1.

In Operation 405, the base station generates first measurement configuration information according to a PCI of at least one cell.

The first measurement configuration information may include the PCI of the at least one cell.

The base station, after receiving the second measurement report information from the target terminal device, may generate the first measurement configuration information according to the PCI of the at least one cell in the second measurement report information. The first measurement configuration information may be configured to implement measurement configuration for the target terminal device. The measurement is performed for enabling the target terminal device to report cell type information of the measured cell.

It is to be noted that the generated first measurement configuration information may include the PCI of the cell reported to the base station by the target terminal device only, or may also include a PCI of a cell reported by another target terminal device connected with the base station. When the generated first measurement configuration information only includes the PCI of the cell reported to the base station by the target terminal device, PCIs of all cells reported to the base station by the target terminal device may be included, or, the PCIs of part of cells reported to the base station by the target terminal device may be included. When the generated first measurement configuration information includes the PCI of the cell reported by another target terminal device connected with the base station, PCIs of all cells reported to the base station by all the target terminal devices may be included, or, the PCIs of part of cells reported to the base station by the all the target terminal devices may be included. There are no specific limits made thereto in the embodiment of the present disclosure.

In Operation 406, the base station sends the first measurement configuration information to the target terminal device.

The base station, after generating the first measurement configuration information, may send the first measurement configuration information to the target terminal device such that the terminal device performs cell measurement based on the first measurement configuration information. The measurement is performed for enabling the target terminal device to report cell type information of a measured target cell. The target cell may be an intersection of the cells measured by the target terminal device based on the second measurement configuration information and at least one cell of which the signal strength meets the preset condition. Moreover, the cell measured by the target terminal device may be a cell in the high-speed-railway dedicated network or may also be a cell among the cells in the non-high-speed-railway dedicated network, so that the cell type may be a cell in the high-speed-railway dedicated network or a cell in the non-high-speed-railway dedicated network.

During the practical application, before the base station generates the first measurement configuration information, Operation 402 to Operation 404 may also be selected not to be executed. In such case, the base station may directly generate the first measurement configuration information and send the first measurement configuration information to all the terminal devices connected with the base station, the all terminal devices including the target terminal device. Or, the base station may select at least one terminal device to be configured that the first measurement configuration information is to be sent to from all the terminal devices connected with the base station and send the generated first measurement configuration information to the at least one terminal device to be configured. The at least one terminal device to be configured may include the target terminal device.

There may be multiple implementation modes for selecting at least one terminal device to be configured that the first measurement configuration information is to be sent to from all the terminal devices connected with the base station, and the implementation modes may refer to the implementation modes for selecting the at least one terminal device to be configured in Operation 402. In an example, the base station may determine a terminal device to be configured from all the terminal devices according to a signal strength of a signal sent by each terminal device among all the terminal devices, or, may determine a terminal device to be configured from all the terminal devices according to a movement speed of each terminal device among all the terminal devices, or, may randomly select a terminal device to be configured from all the terminal devices connected with the base station. There are no specific limits made thereto in the embodiment of the present disclosure.

In Operation 407, the target terminal device performs cell measurement based on the first measurement configuration information to acquire cell type information of a target cell measured by the target terminal device.

The target terminal device, after receiving the first measurement configuration information from the base station, may perform cell measurement based on the first measurement configuration information to acquire the cell type information of the target cell measured by the target terminal device. Optionally, the target terminal device, when performing cell measurement based on the first measurement configuration information, may read system information of the measured cell to acquire the cell type information of the measured cell. Moreover, the target terminal device may periodically perform cell measurement based on the first measurement configuration information.

In Operation 408, the target terminal device sends first measurement report information to the base station.

The target terminal device, after performing cell measurement based on the first measurement configuration information, may generate the first measurement report information including the cell type information of the target cell and send the first measurement configuration information to the base station.

In an example, cells measured by cell measurement of the target terminal device based on the first measurement configuration information include cell 1, cell 2 and cell 3 and the at least one cell of which the signal strength meets the preset condition includes the cell 1, the target cell is the cell 1. Therefore, the target terminal device may read system information of the cell 1 to acquire cell type information of the cell 1, generate first measurement report information including the cell type information of the cell 1 and send the first measurement report information to the base station.

In Operation 409, the base station executes network management on the target terminal device based on the cell type information.

The base station in the high-speed-railway dedicated network, after acquiring the cell type information of the cell measured by the terminal device connected therewith, may execute the network management on the target terminal device based on the cell type information to implement management over the high-speed-railway dedicated network and further enrich functions of the high-speed-railway dedicated network.

Optionally, the network management may include a cell handover and the like. Referring to FIG. 5, since multiple cascaded RRCs acts as cell A in the high-speed-railway dedicated network to provide service for a user on a high-speed train, a signal coverage capability higher than that of the cell B in the non-high-speed-railway dedicated network can be achieved, a terminal device not in the high-speed train also can access the high-speed-railway dedicated network to congest the high-speed-railway dedicated network to bring impact to the communication quality for the user on the high-speed train, and such impact is particularly obvious in an urban region with a large population. When the network management includes a cell handover, the base station may perform the cell handover on the target terminal device according to the cell type information to switch the target terminal device to another base station, for example, switching the target terminal device to a base station in a non-high-speed-railway dedicated network, to reduce a burden of the high-speed-railway dedicated network and further ensure the communication quality for the user on the high-speed train.

The base station, before performing the cell handover on the target terminal device, may select a target terminal device to be handed over to another base station from all target terminal devices reporting cell type information to the base station according to a parameter such as the signal strength and movement speed of the target terminal device, and then perform the cell handover on the target terminal device to be handed over to the another base station. For example, the base station may determine a target terminal device with a movement speed lower than the preset movement speed as a target terminal device to be handed over to the another base station and switch the target terminal device to the another base station.

It is to be noted that, when there is no vehicle on a road section along a high-speed railway, a sleep operation over the base station may be executed to save resources. Or, when there is no vehicle on a road section along the high-speed railway, access to the high-speed-railway dedicated network may be opened to enable a terminal device in an adjacent region of the road section to access the high-speed-railway dedicated network to increase the utilization rate of the high-speed-railway dedicated network.

Moreover, a method for acquiring the cell type information may be implemented through communication between a base station and a terminal device. Compared with the related art, such an implementation mode is independent of an X2 communication interface between a base station and another base station. Therefore, the deployment cost of the high-speed-railway dedicated network may also be reduced through the method.

According to the method for network management provided in the embodiment of the present disclosure, a base station in a high-speed-railway dedicated network may send first measurement configuration information to a target terminal device, the target terminal device may receive first measurement configuration information, perform cell measurement based on it and send cell type information of a cell measured by the target terminal device to the base station, and then the base station in the high-speed-railway dedicated network may execute the network management on the target terminal device based on the cell type information. Compared with the related art, the present disclosure has the advantages that functions of the high-speed-railway dedicated network are enriched, and the flexibility in the use of the high-speed-railway dedicated network is further improved.

It is to be noted that sequences of the operations of the method for network management provided in the embodiments of the present disclosure may be properly regulated and the operations may also be correspondingly added and reduced according to a condition. Any variations apparent to those skilled in the art in the technical scope disclosed in the present disclosure shall fall within the scope of protection of the present disclosure, and thus elaborations are omitted.

Figure 6A:
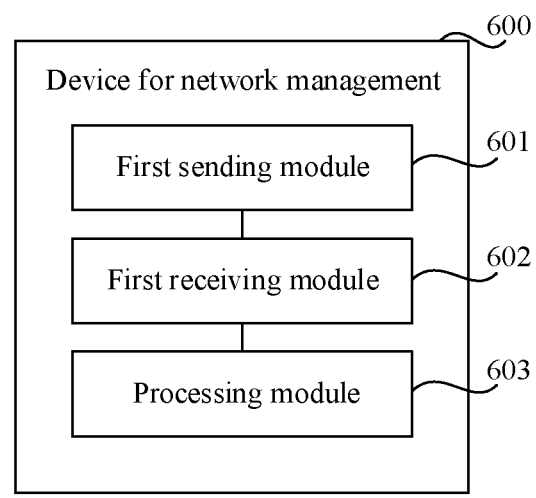
FIG. 6A is a block diagram of a device for network management according to an exemplary embodiment.

FIG. 6A is a block diagram of a device 600 for network management according to an exemplary embodiment. The device 600 for network management may be the base station 10 in FIG. 1. Referring to FIG. 6A, the device 600 for network management may include:

a first sending module 601, configured to send first measurement configuration information to a target terminal device in a high-speed-railway dedicated network;

a first receiving module 602, configured to receive first measurement report information from the target terminal device, the first measurement report information being obtained after the target terminal device performs cell measurement based on the first measurement configuration information, and the first measurement report information including cell type information of a cell measured by the target terminal device; and a processing module 601, configured to execute network management on the target terminal device based on the cell type information.

According to the device for network management provided in the embodiment of the present disclosure, the first sending module is configured to send the first measurement configuration information to the target terminal device, the first receiving module is configured to receive the cell type information of the measured cell from the target terminal device, and the processing module is configured to execute the network management on the target terminal device based on the cell type information. Compared with the related art, the present disclosure has the advantages that functions of the high-speed-railway dedicated network are enriched, and the flexibility in the use of the high-speed-railway dedicated network is further improved.

Figure 6B:
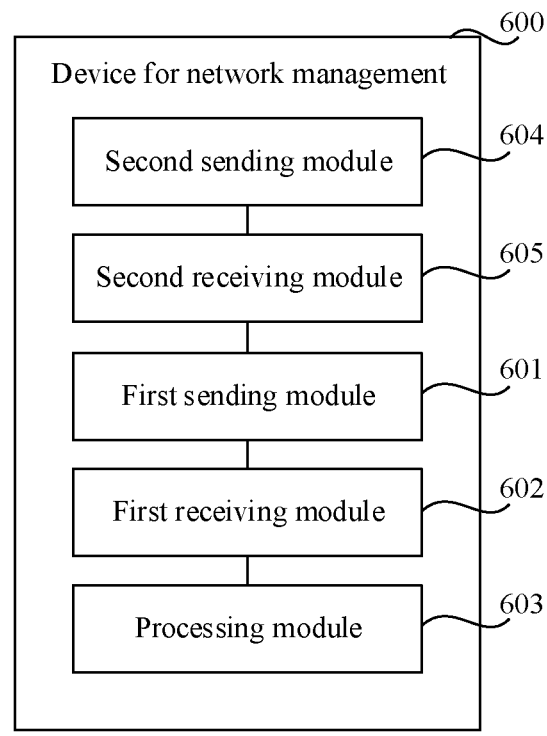
FIG. 6B is a block diagram of another device for network management according to an exemplary embodiment.

Optionally, referring to FIG. 6B, the device 600 may further include:

a second sending module 604, configured to, before the first measurement configuration information is sent to the target terminal device in the high-speed-railway dedicated network, send second measurement configuration information to the target terminal device; and a second receiving module 605, configured to receive second measurement report information from the target terminal device, the second measurement report information being obtained after the target terminal device performs cell measurement based on the second measurement configuration information, the second measurement report information including a PCI of at least one cell, and the at least one cell being a cell which is selected from cells measured by the target terminal device based on the second measurement information and of which a signal strength meets a preset condition.

Optionally, the first sending module 601 is configured to:

generate the first measurement configuration information according to the PCI of the at least one cell, the first measurement configuration information including the PCI of the at least one cell; and send the first measurement configuration information to the target terminal device, the first measurement configuration information being configured for the target terminal device to generate the first measurement report information including cell type information of a target cell, and the target cell being an intersection of the cells measured by the target terminal device based on the second measurement configuration information and the at least one cell.

Optionally, the cell of which the signal strength meets the preset condition may include:

a cell with a maximum signal strength among the cells measured based on the second measurement configuration information, or, a cell with a signal strength greater than a preset strength threshold among the cells measured based on the second measurement configuration information.

Figure 6C:
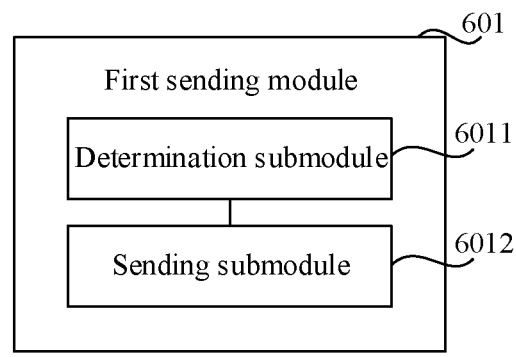
FIG. 6C is a block diagram of a first sending module according to an exemplary embodiment.

Optionally, referring to FIG. 6C, the first sending module 601 may include:

a determination submodule 6011, configured to determine the target terminal device among all terminal devices connected with a base station; and a sending submodule 6012, configured to send the first measurement configuration information to the target terminal device.

Optionally, the determination submodule 6011 is configured to:

acquire a signal strength of a signal sent by each terminal device among all the terminal devices; and determine the target terminal device among all the terminal devices based on the signal strength.

Optionally, the determination submodule 6011 is configured to:

acquire a movement speed of each terminal device among all the terminal devices; and determine the target terminal device among all the terminal devices based on the movement speeds of all the terminal devices.

From the above, according to the device for network management provided in the embodiment of the present disclosure, the first sending module is configured to send the first measurement configuration information to the target terminal device, the first receiving module is configured to receive the cell type information of the measured cell from the target terminal device, and the processing module is configured to execute the network management on the target terminal device based on the cell type information. Compared with the related art, the present disclosure has the advantages that the functions of the high-speed-railway dedicated network are enriched, and the flexibility in the use of the high-speed-railway dedicated network is further improved.

Figure 7A:
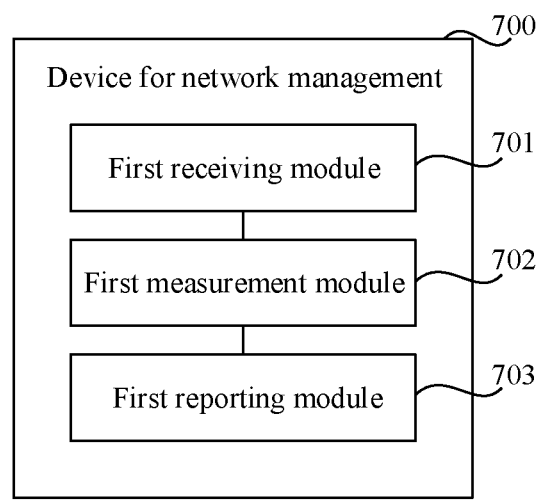
FIG. 7A is a block diagram of another device for network management according to an exemplary embodiment.

FIG. 7A is a block diagram of a device 700 for network management according to an exemplary embodiment. The device 700 for network management may be the terminal device 20 in FIG. 1. Referring to FIG. 7A, the device 700 for network management may include:

a first receiving module 701, configured to receive first measurement configuration information from a base station in a high-speed-railway dedicated network;

a first measurement module 702, configured to perform cell measurement based on the first measurement configuration information to acquire cell type information of a cell measured by a target terminal device; and a first reporting module 703, configured to send first measurement report information to the base station, the first measurement report information including the cell type information of the cell measured by the target terminal device, and the cell type information being configured for the base station to execute network management on the target terminal device.

According to the device for network management provided in the embodiment of the present disclosure, the first receiving module is configured to receive the first measurement configuration information from the base station in the high-speed-railway dedicated network, the first measurement module is configured to perform cell measurement based on the first measurement configuration information, and the first reporting module is configured to send the cell type information of the cell measured by the target terminal device to the base station, and then the base station in the high-speed-railway dedicated network may execute the network management on the target terminal device based on the cell type information. Compared with the related art, the present disclosure has the advantages that functions of the high-speed-railway dedicated network are enriched, and the flexibility in the use of the high-speed-railway dedicated network is further improved.

Figure 7B:
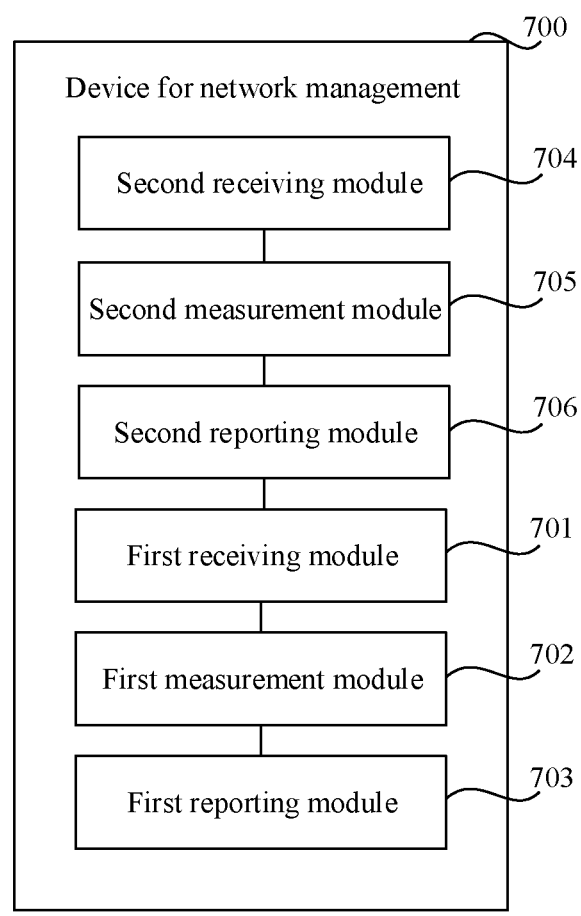
FIG. 7B is a block diagram of another device for network management according to an exemplary embodiment.

Optionally, referring to FIG. 7B, the device 700 may further include:

a second receiving module 704, configured to receive second measurement configuration information from the base station;

a second measurement module 705, configured to perform cell measurement based on the second measurement configuration information to acquire signal strengths of cells measured by the target terminal device based on the second measurement configuration information; and a second reporting module 706, configured to send second measurement report information to the base station, the second measurement report information including a PCI of at least one cell, and the at least one cell being a cell which is selected from the cells measured by the target terminal device based on the second measurement information and of which a signal strength meets a preset condition.

Optionally, the first measurement module 702 is configured to:

perform cell measurement on a target cell based on the first measurement configuration information, the target cell being an intersection of the cells measured by the target terminal device based on the second measurement configuration information and the at least one cell.

Optionally, the cell of which the signal strength meets the preset condition may include: a cell with a maximum signal strength among the cells measured based on the second measurement configuration information, or, a cell with a signal strength greater than a preset strength threshold among the cells measured based on the second measurement configuration information.

According to the device for network management provided in the embodiment of the present disclosure, the first receiving module is configured to receive the first measurement configuration information from the base station in the high-speed-railway dedicated network, the first measurement module is configured to perform cell measurement based on the first measurement configuration information, and the first reporting module is configured to send the cell type information of the cell measured by the target terminal device to the base station, and then the base station in the high-speed-railway dedicated network may execute the network management on the target terminal device based on the cell type information. Compared with the related art, the present disclosure has the advantages that the functions of the high-speed-railway dedicated network are enriched, and the flexibility in the use of the high-speed-railway dedicated network is further improved.

With respect to the devices in the above embodiments, the specific manners for performing operations for individual modules and submodules therein have been described in detail in the embodiments regarding the methods, which will not be elaborated herein.

The embodiments of the present disclosure also provide a device for network management, which may include:

a processor; and a memory configured to store instructions executable by the processor, wherein the processor is configured to:

send first measurement configuration information to a target terminal device in a high-speed-railway dedicated network;

receive first measurement report information from the target terminal device, the first measurement report information being obtained after the target terminal device performs cell measurement based on the first measurement configuration information, and the first measurement report information including cell type information of a cell measured by the target terminal device; and execute network management on the target terminal device based on the cell type information.

The embodiments of the present disclosure also provide a device for network management, which may include:

a processor; and a memory configured to store instructions executable by the processor, wherein the processor is configured to:

receive first measurement configuration information from a base station in a high-speed-railway dedicated network;

perform cell measurement based on the first measurement configuration information to acquire cell type information of a cell measured by a target terminal device; and send first measurement report information to the base station, the first measurement report information including the cell type information of the cell measured by the target terminal device and the cell type information being configured for the base station to execute network management on the target terminal device.

The embodiments of the present disclosure also provide a system for network management, which may include a base station and a terminal device.

The base station is configured to execute the method for network management shown in FIG. 1 or FIG. 4.

The terminal device is configured to execute the method for network management shown in FIG. 2 or FIG. 4.

The embodiments of the present disclosure also provide a computer-readable storage medium, which is characterized in that a computer program has been stored in the computer-readable storage medium. The stored computer program may be executed by a processing component to implement the method for network management in FIG. 1 or FIG. 4, or, the stored computer program may be executed by the processing component to implement the method for network management in FIG. 2 or FIG. 4.

The embodiments of the present disclosure also provide a computer program product including instructions, which are run in a computer to enable the computer to implement the method for network management provided in the exemplary embodiments of the present application.

Figure 8:
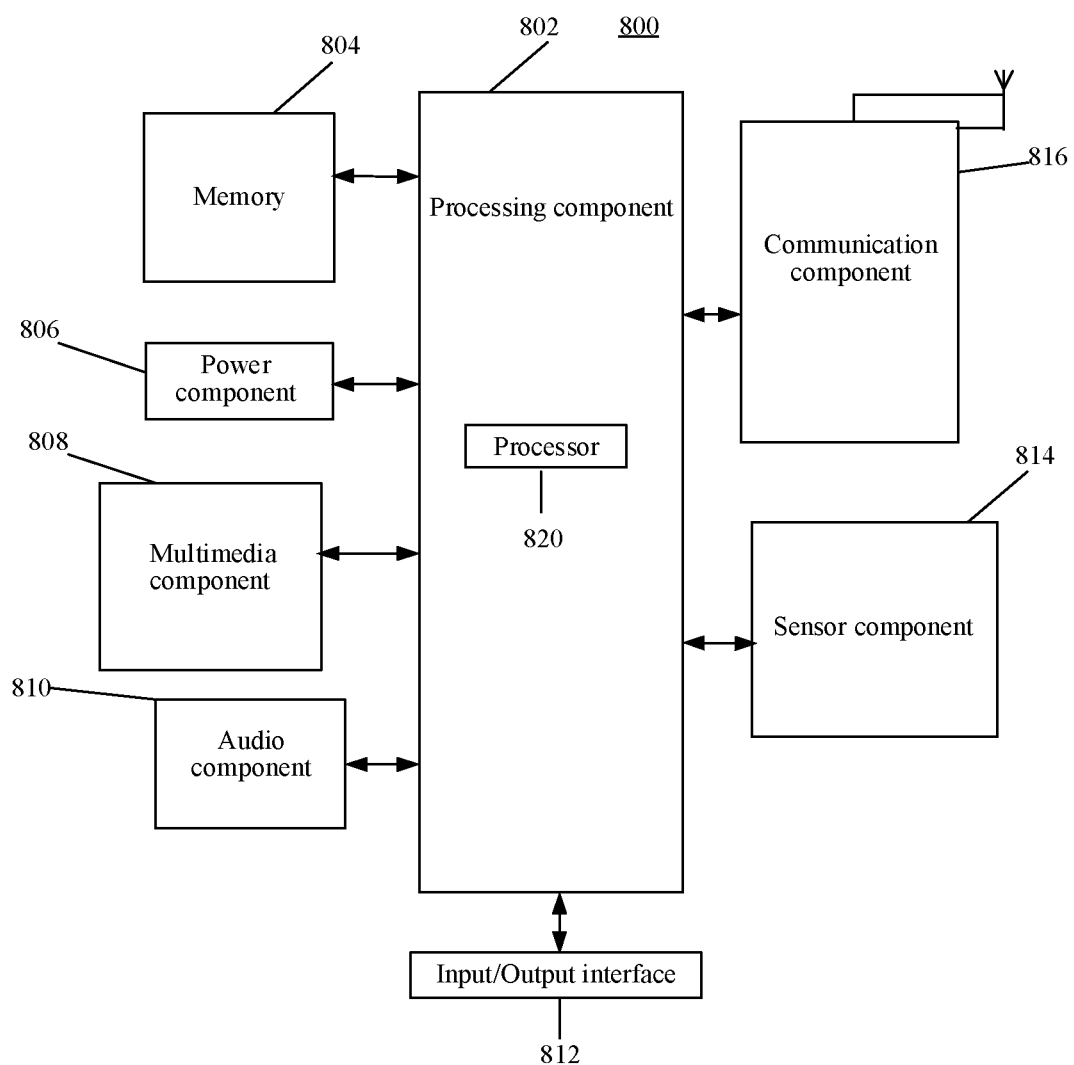
FIG. 8 is a block diagram of another device for network management according to an exemplary embodiment.

FIG. 8 is a block diagram of a device 800 for network management according to an exemplary embodiment. For example, the device 800 may be a mobile phone, a computer, a digital broadcast terminal, a messaging device, a gaming console, a tablet, a medical device, exercise equipment, a personal digital assistant and the like.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 is typically configured to control overall operations of the device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as an Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 may include a power management system, one or more power supplies, and other components associated with generation, management and distribution of power for the device 800.

The multimedia component 808 may include a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 is configured to provide an interface between the processing component 802 and a peripheral interface module, and the peripheral interface module may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a Wireless Fidelity (WiFi) network, a 2nd-Generation (2G) or 3rd-Generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method executed by a terminal device in the method for network managements provided in the embodiments of the present disclosure.

In an exemplary embodiment, there is also provided a non-transitory computer-readable storage medium including instructions, such as the memory 804 including instructions, and the instructions may be executed by the processor 820 of the device 800 to implement the method executed by a terminal device in the method for network managements provided in the embodiments of the present disclosure. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 9:
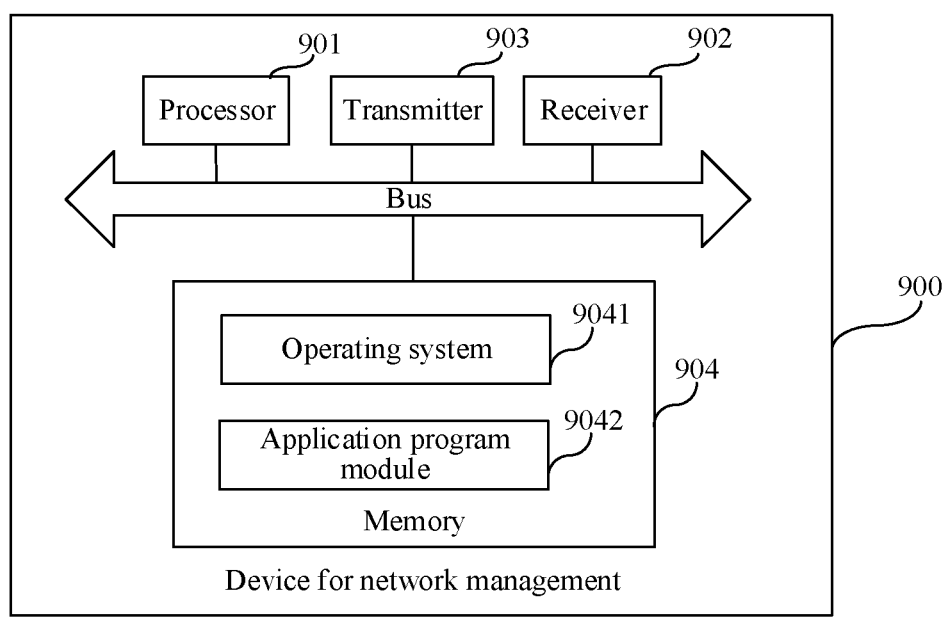
FIG. 9 is a block diagram of another device for network management according to an exemplary embodiment.

FIG. 9 is a block diagram of a device 900 for network management according to an exemplary embodiment. For example, the device 900 for network management may be a base station. As shown in FIG. 9, the device 900 for network management may include a processor 901, a receiver 902, a transmitter 903 and a memory 904. The receiver 902, the transmitter 903 and the memory 904 are connected with the processor 901 through a bus respectively.

The processor 901 includes one or more than one processing core, and the processor 901 may run a software program and modules to execute the method executed by a base station in the methods for network management provided in the embodiments of the present disclosure. The memory 904 may be configured to store the software program and the modules. Specifically, the memory 904 may store an operating system 9041 and an application program module 9042 required by at least one function. The receiver 902 is configured to receive target communication data from another device, and the transmitter 903 is configured to send target communication data to the other device.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for network management, comprising:
sending second measurement configuration to a target terminal device;
receiving second measurement report from the target terminal device, wherein the second measurement report is obtained after the target terminal device performs cell measurement based on the second measurement configuration, wherein the second measurement report comprises a physical-layer cell identity (PCI) of at least one cell, and the at least one cell is selected from cells measured by the target terminal device based on the second measurement configuration and the at least one cell has a signal strength meets a preset condition;
sending first measurement configuration to the target terminal device in a high-speed-railway dedicated network;
receiving first measurement report from the target terminal device, wherein the first measurement report is obtained after the target terminal device performs cell measurement based on the first measurement configuration and wherein the first measurement report comprises cell type information of a cell measured by the target terminal device; and
executing network management on the target terminal device based on the cell type information.

2. The method of claim 1, wherein sending the first measurement configuration to the target terminal device in the high-speed-railway dedicated network comprises:
generating the first measurement configuration according to the PCI of the at least one cell, the first measurement configuration comprising the PCI of the at least one cell; and
sending the first measurement configuration to the target terminal device, wherein the first measurement configuration is configured for the target terminal device to generate the first measurement report comprising cell type information of a target cell, and the target cell is an intersection of the at least one cell and the cells measured by the target terminal device based on the second measurement configuration.

3. The method of claim 1, wherein the preset condition comprises:

whether the at least one cell has a maximum signal strength among the cells measured based on the second measurement configuration, or, whether the at least one cell has a signal strength greater than a preset strength threshold among the cells measured based on the second measurement configuration.

4. The method of claim 1, wherein sending the first measurement configuration to the target terminal device in the high-speed-railway dedicated network comprises:

determining the target terminal device among all terminal devices connected with a base station; and sending the first measurement configuration to the target terminal device.

5. The method of claim 4, wherein determining the target terminal device among all the terminal devices connected with the base station comprises:

acquiring a feedback sent by each terminal device among all the terminal devices; and feedbacks from all the terminal devices, wherein the feedback comprises a signal strength of a signal or a movement speed of each terminal device determining the target terminal device among all the terminal devices based on the movement speeds.

6. A method for network management, comprising:

receiving second measurement configuration from a base station;

performing cell measurement based on the second measurement configuration to acquire signal strengths of cells measured by a target terminal device based on the second measurement configuration; and sending second measurement report to the base station, wherein the second measurement report comprises a physical-layer cell identity (PCI) of at least one cell, the at least one cell is selected from the cells measured by the target terminal device based on the second measurement configuration and the at least one cell has a signal strength meets a preset condition;

receiving first measurement configuration from the base station in a high-speed-railway dedicated network;

performing cell measurement based on the first measurement configuration to acquire cell type information of a cell measured by the target terminal device; and sending first measurement report to the base station, wherein the first measurement report comprises the cell type information of the cell measured by the target terminal device and the cell type information is configured for the base station to execute network management on the target terminal device.

7. The method of claim 6, wherein performing cell measurement based on the first measurement configuration comprises:

configuration, wherein the target cell is an intersection of the cells measured by the target terminal device based on the second measurement configuration and the at least one cell.

8. The method of claim 6, wherein the preset condition comprises:

whether the at least one cell has a maximum signal strength among the cells measured based on the second measurement configuration, or, whether the at least one cell has a signal strength greater than a preset strength threshold among the cells measured based on the second measurement configuration.

9. A device for network management, comprising:

a processor; and a memory configured to store instructions executable by the processor, wherein the processor is configured to:

send second measurement configuration to a target terminal device;

receive second measurement report from the target terminal device, wherein the second measurement report is obtained after the target terminal device performs cell measurement based on the second measurement configuration, the second measurement report comprises a physical-layer cell identity (PCI) of at least one cell, and the at least one cell is selected from cells measured by the target terminal device based on the second measurement configuration and the at least one cell has a signal strength meets a preset condition;

send first measurement configuration to the target terminal device in a high-speed-railway dedicated network;

receive first measurement report from the target terminal device, wherein the first measurement report is obtained after the target terminal device performs cell measurement based on the first measurement configuration and the first measurement report comprises cell type information of a cell measured by the target terminal device; and execute network management on the target terminal device based on the cell type information.

10. The device of claim 9, wherein the processor is further configured to:

generate the first measurement configuration according to the PCI of the at least one cell, wherein the first measurement configuration comprises the PCI of the at least one cell; and configuration to the target terminal device, wherein the first measurement configuration is configured for the target terminal device to generate the first measurement report comprising cell type information of a target cell, and the target cell is an intersection of the cells measured by the target terminal device based on the second measurement configuration and the at least one cell.

11. The device of claim 9, wherein the preset condition comprises:

whether the at least one cell has a maximum signal strength among the cells measured based on the second measurement configuration, or, whether the at least one cell has a signal strength greater than a preset strength threshold among the cells measured based on the second measurement configuration.

12. The device of claim 9, wherein the processor is further configured to:

determine the target terminal device among all terminal devices connected with a base station; and send the first measurement configuration to the target terminal device.

13. The device of claim 12, wherein the processor is further configured to:

acquire a signal strength of a signal sent by each terminal device among all the terminal devices; and determine the target terminal device among all the terminal devices based on the signal strengths;

or, acquire a movement speed of each terminal device among all the terminal devices, and determine the target terminal device among all the terminal devices based on the movement speeds of all the terminal devices.

14. A device for network management, comprising:

a processor; and a memory configured to store instructions executable by the processor, wherein the processor is configured to implement the operations of the method of claim 6.

15. The device of claim 14, wherein the processor is further configured to:
perform cell measurement on a target cell based on the first measurement configuration, wherein the target cell is an intersection of the cells measured by the target terminal device based on the second measurement configuration and the at least one cell.

16. The device of claim 14, wherein the preset condition comprises:
whether the at least one cell has a maximum signal strength among the cells measured based on the second measurement configuration, or,
whether the at least one cell has a signal strength greater than a preset strength threshold among the cells measured based on the second measurement configuration.

* * * * *